(12) United States Patent
Tapaninen et al.

(10) Patent No.: US 7,369,632 B2
(45) Date of Patent: May 6, 2008

(54) DIVERSITY-MODE DELAY LOCK LOOP CIRCUIT AND ASSOCIATED METHOD FOR A RADIO RECEIVER

(75) Inventors: Jukka Tapaninen, San Diego, CA (US); Thomas J. Kenney, San Diego, CA (US)

(73) Assignee: Nokia Corporation, Espoo (FI)

( * ) Notice: Subject to any disclaimer, the term of this patent is extended or adjusted under 35 U.S.C. 154(b) by 567 days.

(21) Appl. No.: 11/046,113

(22) Filed: Jan. 28, 2005

(65) Prior Publication Data

US 2006/0171491 A1    Aug. 3, 2006

(51) Int. Cl.
H04B 7/10    (2006.01)
(52) U.S. Cl. ..................................... 375/347
(58) Field of Classification Search ............... 375/347, 375/354, 357, 369, 372, 373, 374, 376, 215, 375/294, 327; 370/395.62, 503, 507; 455/265, 455/266, 180.3; 702/89; 713/375, 400; 342/103
See application file for complete search history.

(56) References Cited

U.S. PATENT DOCUMENTS

| | | | |
|---|---|---|---|
| 6,463,091 B1 | 10/2002 | Zhodzicshsky et al. | |
| 6,525,615 B1 | 2/2003 | Masenas et al. | |
| 6,735,242 B1 | 5/2004 | Kenney et al. | |
| 6,834,087 B2 | 12/2004 | Kenney et al. | |
| 2003/0063657 A1* | 4/2003 | Bultan et al. | ............... 375/147 |
| 2004/0151272 A1 | 8/2004 | Kenney et al. | |

OTHER PUBLICATIONS

Kiasaleh, Channel-Aided, Decision-Directed Delay-Locked Loop for Pilot Symbol Aided CDMA Communications Impaired by Fast Frequency-Selective Rayleigh Fading and User Interference, 2000, IEEE, p. 1392-1407.*
Oh, Coherent DLL Code Tracking and BER Effect on QPSK Demodulation in Wideband DS-CDMA Reverse Link, 1998, IEEE, p. 2408-2410.*

* cited by examiner

Primary Examiner—Sam K. Ahn
(74) Attorney, Agent, or Firm—Alston & Bird LLP

(57) ABSTRACT

A receiver and method are provided for receiving signals transmitted thereto from a transmitter during operation of a radio communication system. To synchronize the receiver with the transmitter, the receiver includes a delay lock loop circuit capable of receiving a pilot signal and a diversity signal transmitted from a plurality of transmit antennas and/or received by a plurality of receive antennas. The delay lock loop circuit is capable of calculating a first error signal based upon the pilot signal, and a second error signal based upon the diversity signal. The delay lock loop circuit is then capable of forming a combined error signal based upon the first and second error signals, and capable of synchronizing the receiver with the transmitter based upon the combined error signal.

24 Claims, 8 Drawing Sheets

DIVERSITY-MODE DELAY LOCK LOOP CIRCUIT AND ASSOCIATED METHOD FOR A RADIO RECEIVER

FIELD OF THE INVENTION

The present invention generally relates to systems and methods of synchronizing communications in a radio communication system, and more particularly relates to a delay lock loop circuit and associated method that synchronizes a receiver to a transmitter in a radio communication system whereby one of the receiver and transmitter operate in a diversity mode.

BACKGROUND OF THE INVENTION

A communication system operates to communicate data between two or more locations at which communication stations, operable in the communication system, are positioned. Data, sourced at a sending station, is communicated upon a communication channel to be terminated at a receiving station. Many varied types of communication systems have been developed and communication of data through the use of such communication systems is a pervasive aspect of modern society. And the need to communicate data shall likely become increasingly pervasive in the future.

Advancements in communication technologies are implemented into existing communication systems to improve their performance. And advancements in communication technologies have permitted the implementation of new types of communication systems that provide for new types of communication services, previously unavailable.

A radio communication system is an exemplary communication system and is exemplary of a type of communication system in which advancements in communication technologies have been implemented. New types of communication services, and effectuation of conventional communication services in improved manners, are possible as a result of implementation of such advancements in communication technologies.

Communication channels defined in a radio communication system are defined upon radio links that extend between communication stations of the radio communication system. The need to utilize a conventional, wireline connection along the entire communication path extending between sending and receiving stations of the communication system is obviated. For at least a portion of the communication path, a radio link is substituted for the wireline connection. And, when the radio link is substituted for the wireline connection, the need otherwise to utilize a wireline connection along that portion of the communication path is obviated.

A radio communication system provides various advantages. Initial installation and deployment of a radio communication system is generally performed in a less costly manner than the corresponding costs required of installing and deploying a wireline counterpart. Also, a radio communication system is permitting of implementation as a mobile communication system. In a mobile communication system, one or more of the communication stations operable therein is mobile, i.e., is permitted movement.

A cellular communication system is a type of mobile communication system. Cellular communication systems have achieved high levels of usage and the network infrastructures of cellular communication systems have been installed to encompass significant portions of the populated areas of the world. Voice, and other data, services are effectuated through the use of a cellular communication system.

A cellular communication system is generally constructed to be in conformity with a standard, operational protocol promulgated by a standards-creating body, such as the EIA/TIA. Successive generations of communication standards have been promulgated, and communication systems have been implemented to be in operational conformity therewith. First-generation, second-generation, third-generation, and successor-generation operational specifications have been promulgated or are under discussion.

Several of the operational specifications set forth CDMA (Code Division Multiple Access) communication schemes, utilizing spread-spectrum communication techniques. The IS-95, IS-98, and IS-2000 operational specifications set forth the operational parameters of communication systems that utilize CDMA communication schemes. Other operational specifications set forth the operating parameters of communication systems that utilize other communication schemes, such as TDMA (time-division, multiple-access) schemes or conventional analog communication schemes.

Communication stations operable in a cellular communication system pursuant to a communication session must be in synchronization with one another so that the data that is communicated therebetween is successfully received. A delay lock loop circuit, forming part of a receiver, is sometimes used by which to place, and maintain, the receiver in synchronization with the transmitter. Such circuits are used in spread-spectrum systems as well as other cellular, and other radio, communication systems. Delay lock loop circuits, for instance, are used in communication systems operable pursuant to an IEEE 802.11 protocol, the aforementioned IS-95/IS-2000 protocols, and a WCDMA protocol. In an IS-95/IS-2000 system, the receiver utilizes a pilot signal broadcast during operation of such a communication system, to place the receiver in synchronization with a transmitter.

A delay lock loop circuit generally has two operating modes. A first mode, referred to as an acquisition mode, is first used during initial synchronization when the initial timing between the transmitter and receiver is only coarsely known. In this mode, the delay lock loop circuit attempts to align the receiver and transmitter in a quick manner. Thereafter, a second mode, referred to as a tracking mode, is used. In the tracking mode, the timing of the receiver is close to the correct timing epoch. And, when in the tracking mode, the delay lock loop further reduces timing errors between the receiver and transmitter.

When in the acquisition mode, the timing error is maintained with some known variance, which is dependent upon loop parameters. The amount of variance is traded-off against a desired pull-in time. When in the tracking mode, there no longer is a pull-in requirement, and the loop bandwidth of the delay lock loop circuit is changed in order to provide a tracking error that exhibits a smaller variance.

Conventionally, the architecture of the delay lock loop circuit used for the acquisition mode and the delay lock loop circuit used for the tracking mode use different loop filters.

Conventional delay lock loop circuits, however, are input signal-dependent. That is to say, the delay lock loop circuit is inherently dependent upon the input signal level of input signals applied thereto. And, thus, the circuit is constructed to be capable to receive a range of input signal levels, and circuit-construction compromises are made at other signal levels. Normalization of input signal values is sometimes required and, when the input signal is beyond the accepted range of input signal levels, the delay lock loop circuit might not perform acceptably.

Delay lock loop circuits and methods have been developed in an effort to improve the manner by which a receiver is placed, and maintained, in synchronization with a transmitter. One such system and method is disclosed by U.S. Pat. No. 6,834,087, entitled: *Delay Lock Loop Circuit, and Associated Method, for a Radio Receiver*, issued on Dec. 21, 2004, the contents of which are hereby incorporated by reference in its entirety. In this regard, the '087 patent provides a delay lock loop circuit that is selectively operable in an acquisition mode and a tracking mode. A selector selects operating parameters of elements of the delay lock loop circuit to cause operation of the circuit alternately in the acquisition mode and the tracking mode. Through appropriate selection of the operating parameters, a selected one of the operating modes is effectuated. As also provided by the '087 patent, the delay lock loop circuit is amplitude-independent, operable irrespective of the values of the input signals applied thereto.

Delay lock loop circuits such as that disclosed by the '087 patent overcome many drawbacks of the conventional delay lock loop circuits. As will be readily appreciated by those skilled in the art, however, it is generally desirable to further improve upon existing systems and methods, including the delay lock loop circuit of the '087 patent.

SUMMARY OF THE INVENTION

In light of the foregoing background, embodiments of the present invention provide an improved receiver and method for synchronizing signals at a receiver during operation of a radio communication system, such as a cellular communication system that utilizes a spread-spectrum communication scheme. In accordance with embodiments of the present invention, the radio communication system can be configured in a transmit diversity mode whereby signals are transmitted from a transmitter through a channel by means of a plurality of antennas. Additionally or alternatively, the radio communication system can be configured in a receive diversity mode whereby signals are transmitted through a channel for receipt by a receiver by means of a plurality of antennas. With the system operating in a diversity mode, a delay lock loop circuit can be configured to synchronize the receiver with the transmitter not only based upon a pilot signal from the transmitter, but also based upon a diversity signal transmitted from the transmitter (in the transmit diversity mode), or received by the receiver (in the receive diversity mode). Further, embodiments of the present invention provide means for synchronizing the receiver with the transmitter in instances where the signals transmitted from the transmitter, and received by the receiver, are discontinuous.

According to one aspect of the present invention, a receiver is provided for receiving signals transmitted thereto from a transmitter during operation of a radio communication system. To synchronize the receiver with the transmitter, the receiver includes a delay lock loop circuit capable of receiving a pilot signal and a diversity signal transmitted from a plurality of transmit antennas and/or received by a plurality of receive antennas. The delay lock loop circuit is capable of calculating a first error signal based upon the pilot signal, and a second error signal based upon the diversity signal. The delay lock loop circuit is then capable of forming a combined error signal based upon the first and second error signals, and capable of synchronizing the receiver with the transmitter based upon the combined error signal. If so desired, the delay lock loop circuit can further include a selector capable of alternately selecting operation of the delay lock loop circuit in an acquisition mode and a tracking mode.

The delay lock loop circuit can include, for example, a first arrangement capable of calculating the first error signal based upon sampled representations of the pilot signal. Similarly, the delay lock loop circuit can include a second arrangement capable of calculating the second error signal based upon sampled representations of the diversity signal. A summation element of the delay lock loop circuit is then capable of forming the combined error signal based upon the first and second error signals.

More particularly, the delay lock loop circuit can be in a transmit diversity mode to receive a pilot signal and a diversity signal from a plurality of transmit antennas through a channel. In such instances, the first arrangement can be capable of mixing sampled representations of the pilot signal with a first cover code, and thereafter calculating the first error signal based upon the mixed signals. The second arrangement, on the other hand, can be capable of mixing sampled representations of the diversity signal with a second cover code, and thereafter calculating the second error signal based upon the mixed signals.

In lieu of being configured in the transmit diversity mode, the delay lock loop circuit can be configured in a receive diversity mode to receive a pilot signal and a diversity signal from a plurality of receive antennas, including a first antenna receiving the pilot signal and a second antenna receiving the diversity signal. In these instances, the first arrangement can be capable of calculating the first error signal based upon sampled representations of the pilot signal received by the first antenna. Similarly, the second arrangement can be capable of calculating the second error signal based upon sampled representations of the diversity signal received by the second antenna.

In various instances, the delay lock loop circuit can be capable of receiving a discontinuous pilot signal and diversity signal. In such instances, the delay lock loop circuit can be capable of calculating the first error signal based upon sampled representations of the pilot signal, and calculating the second error signal based upon sampled representations of the diversity signal. More particularly for example, the sampled representations of each of the pilot signal and diversity signal can include a zero offset, a positive offset and a negative offset. The delay lock loop circuit can then be capable of calculating the first error signal based upon powers of the positive and negative offsets, and independent of a power of the zero offset, of the pilot signal. Similarly, the delay lock loop can be capable of calculating the second error signal based upon powers of the positive and negative offsets, and independent of a power of the zero offset, of the diversity signal.

According to other aspects of the present invention an improved method is provided for synchronizing signals at a receiver. Embodiments of the present invention therefore provide an improved receiver and method for synchronizing signals during operation of a receiver in a radio communication system, where the system is configured in a diversity mode and/or to receive discontinuous signals. Embodiments of the present invention are capable of utilizing a diversity mode signal in addition to the otherwise utilized pilot signal to synchronize the receiver with a transmitter. In this regard, embodiments of the present invention provide arrangements capable of calculating error signals for the pilot and diversity signals, where the arrangements can calculate the error signals based upon the powers of positive and negative offsets when the received signals are discontinuous. A combined error signal can then be formed based upon the first and second error signals, with a sample selection signal being generated based upon the combined error signals. The sample selection signal can then be utilized by the delay lock loop circuit to synchronize the receiver with the transmitter. As such, the receiver and method of embodiments of the present invention solve the problems identified by prior techniques and provide additional advantages.

BRIEF DESCRIPTION OF THE DRAWINGS

Figure 1:
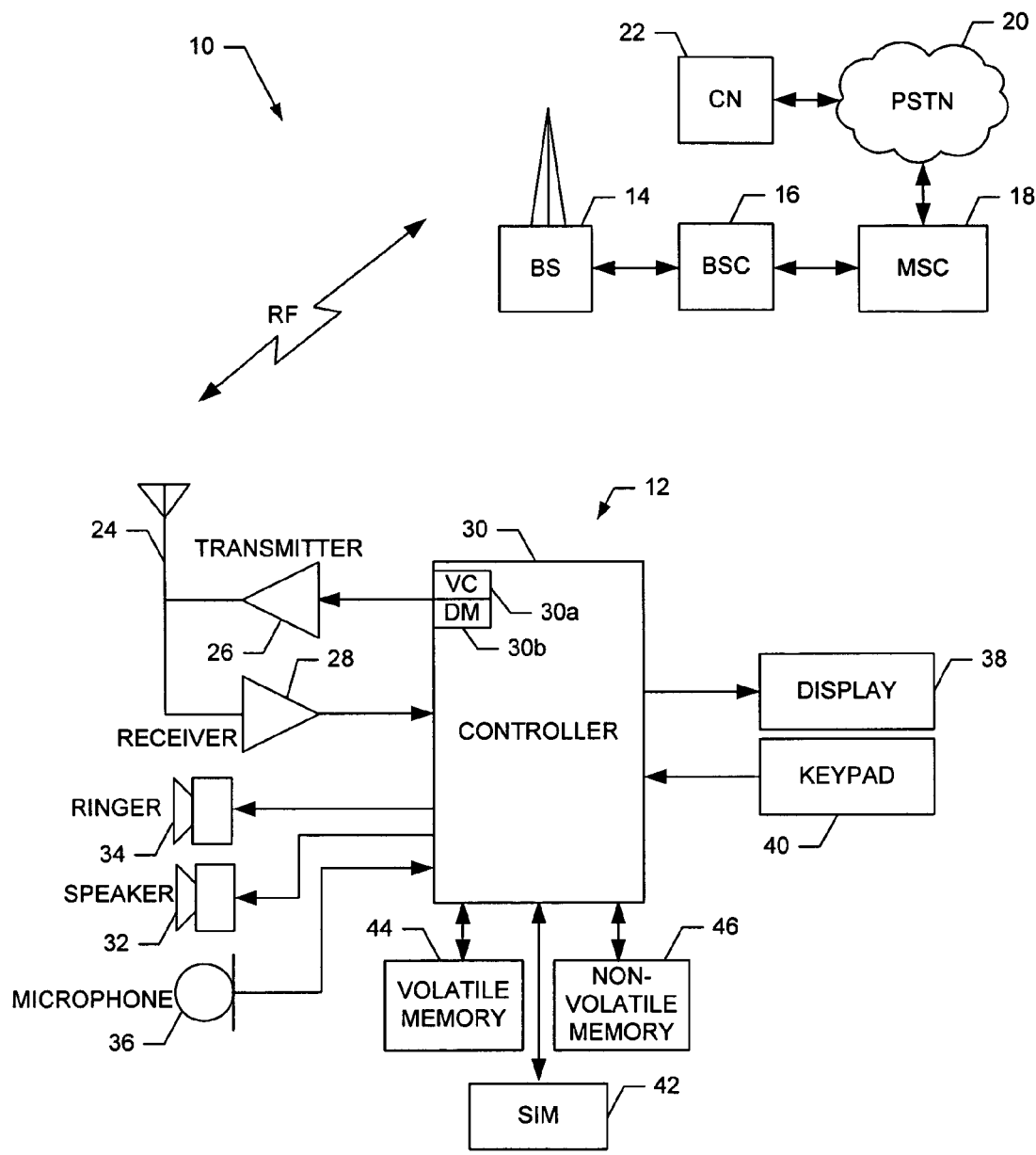
Figure 2:
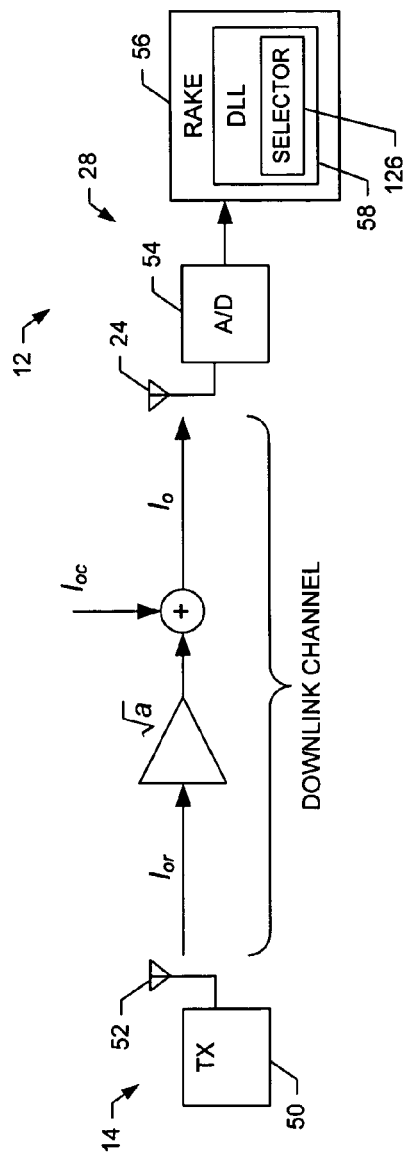
Figure 4:
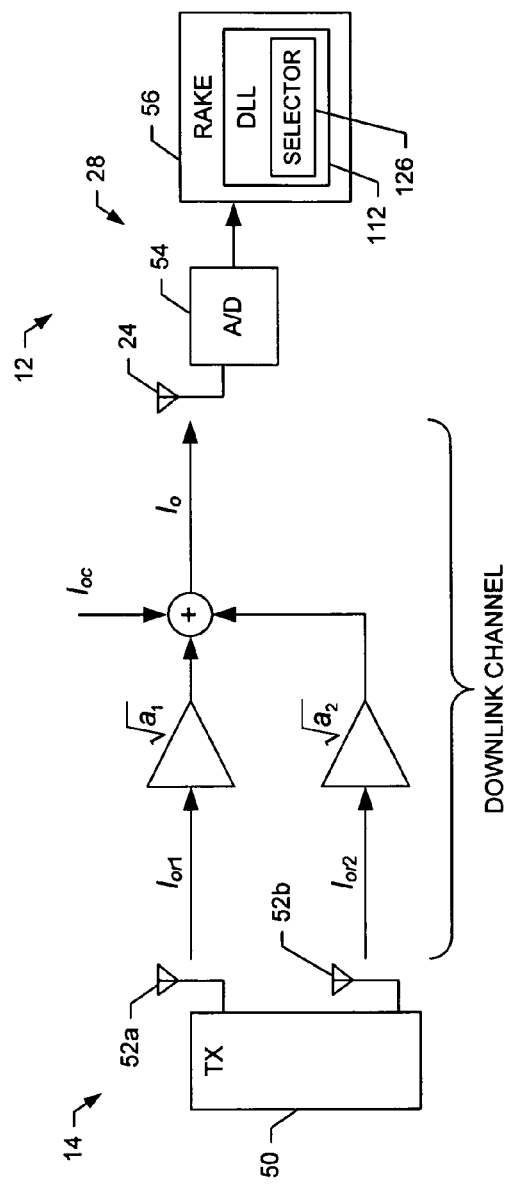
Figure 3:
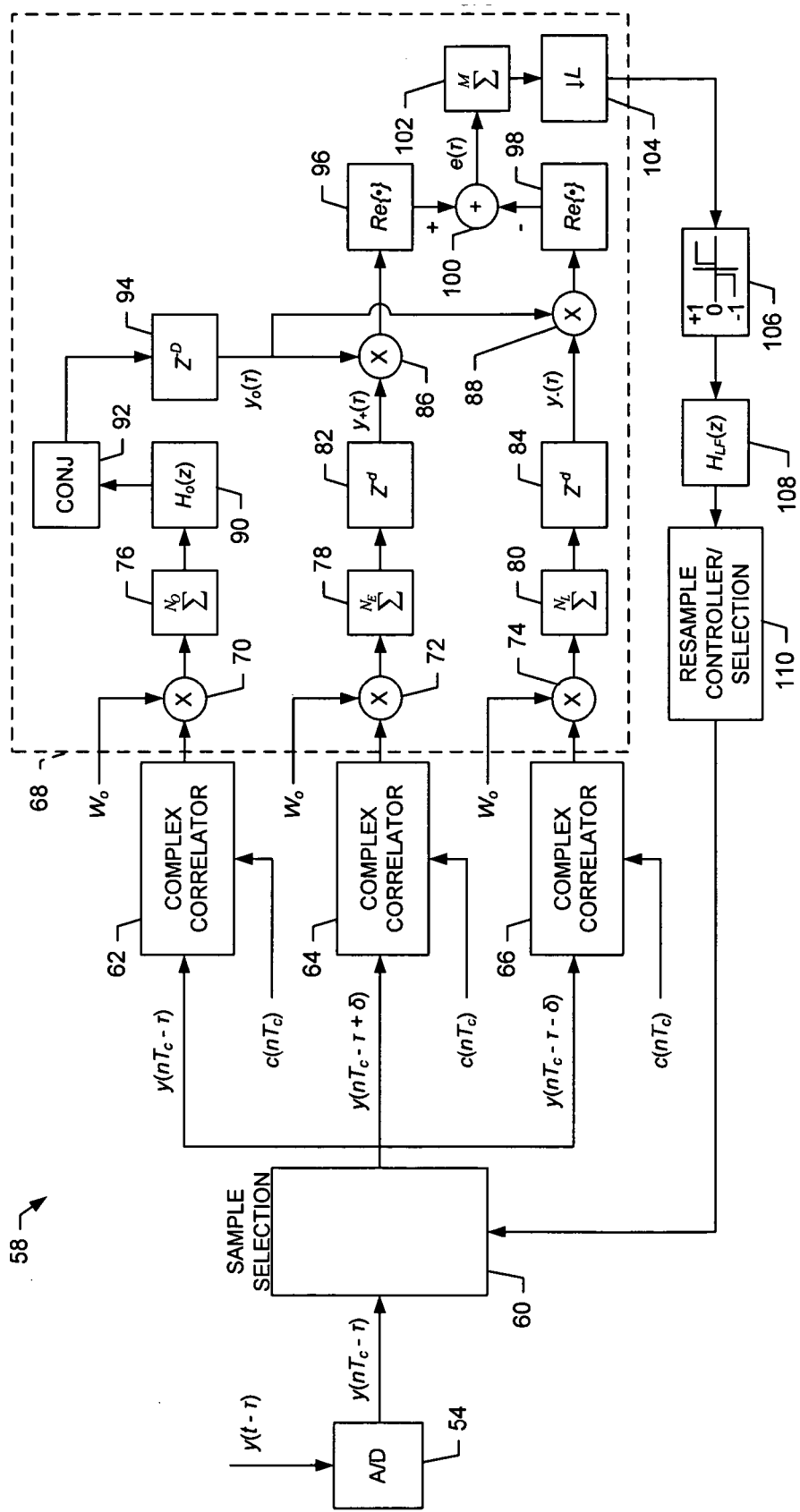
Figure 5:
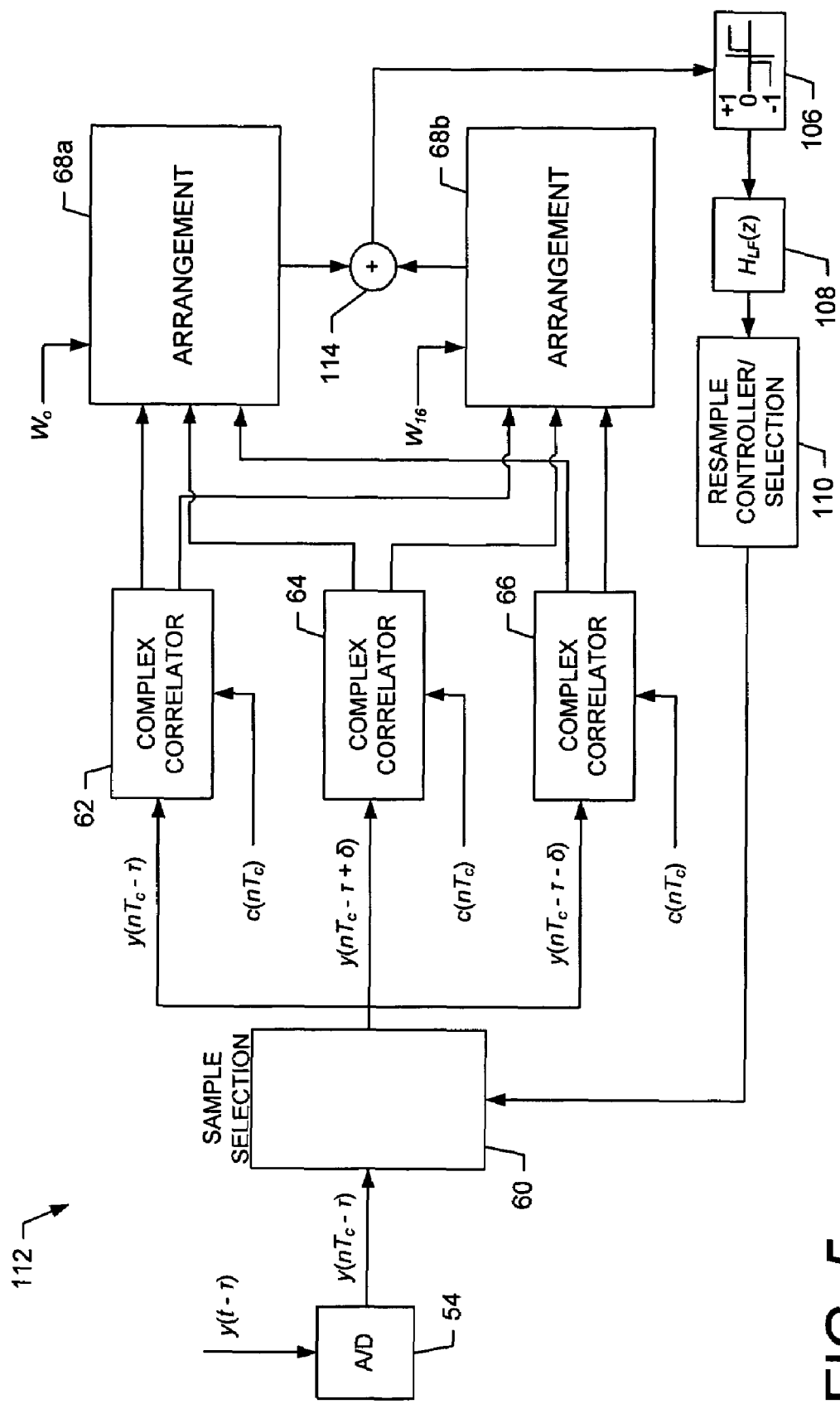
Figure 6:
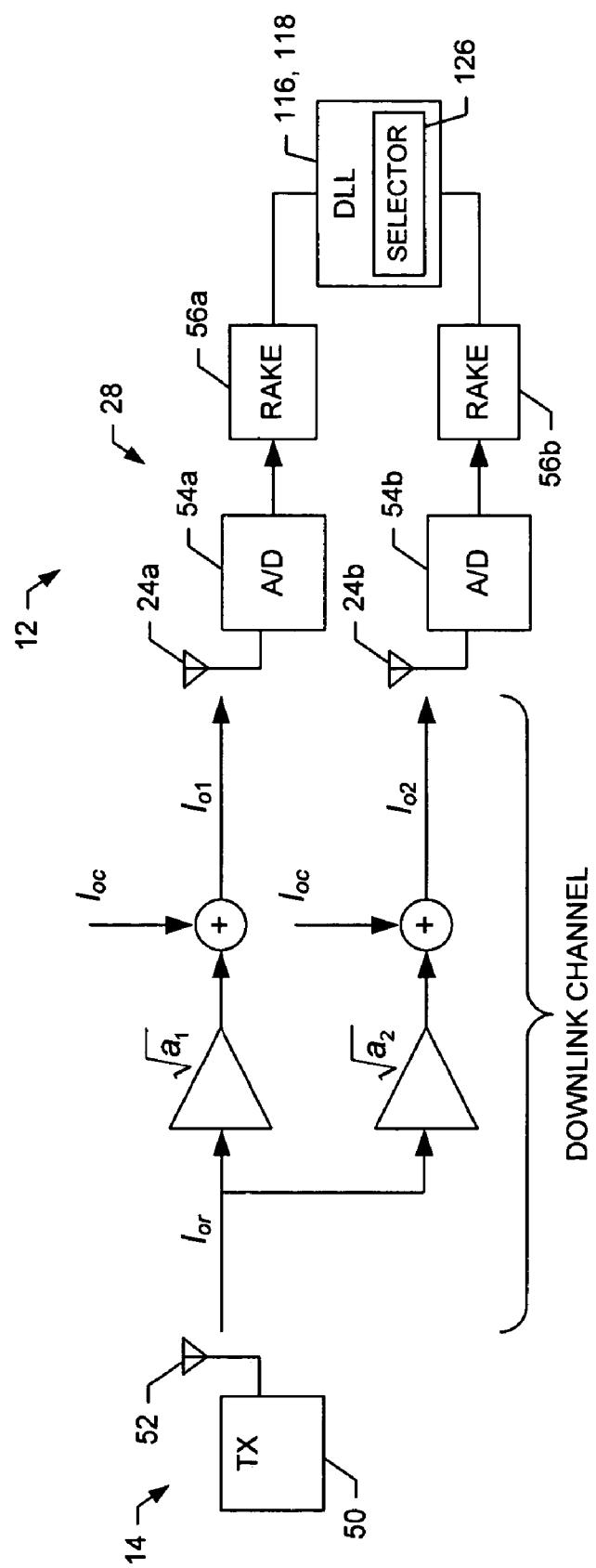
Figure 7:
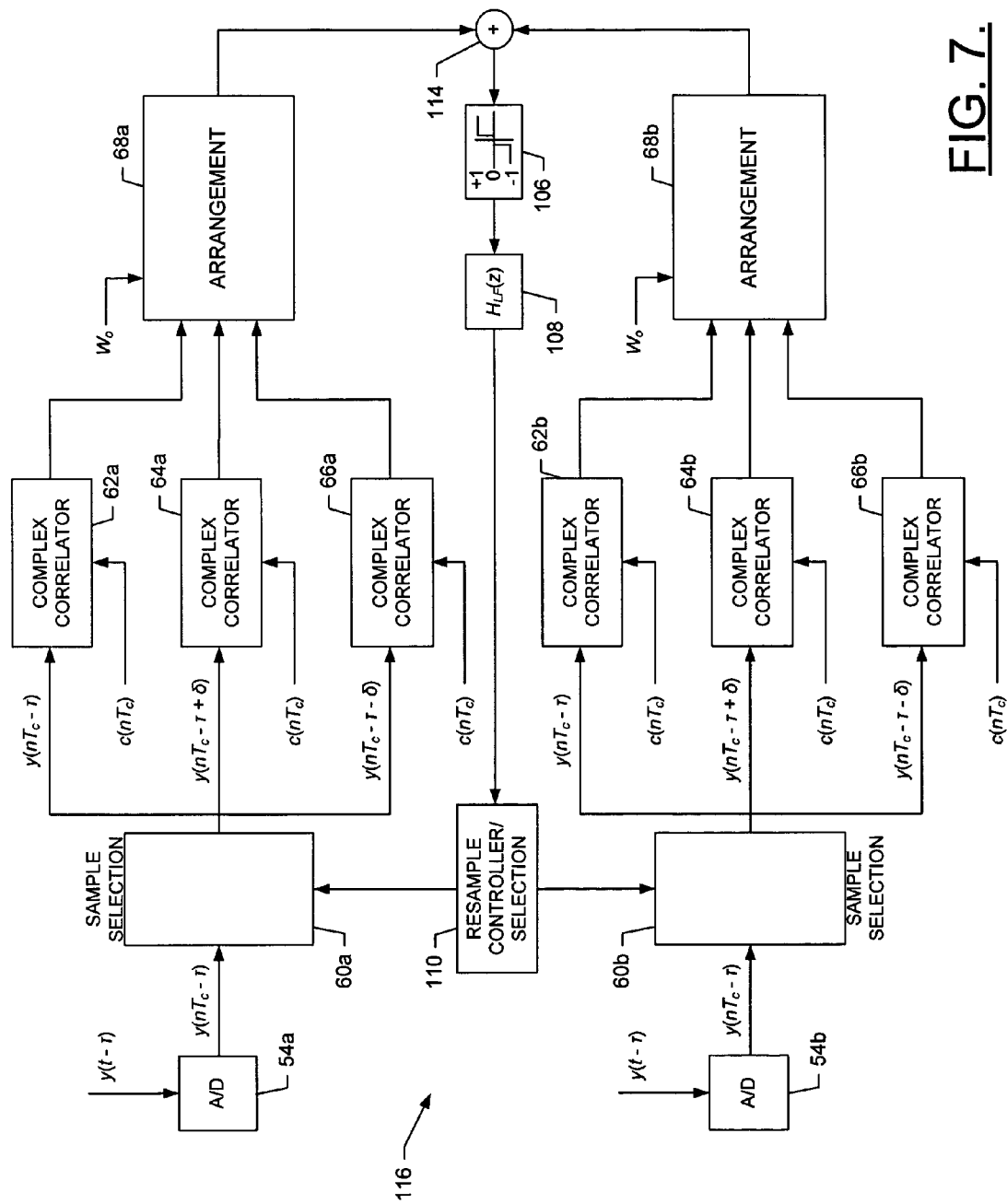
Figure 8:
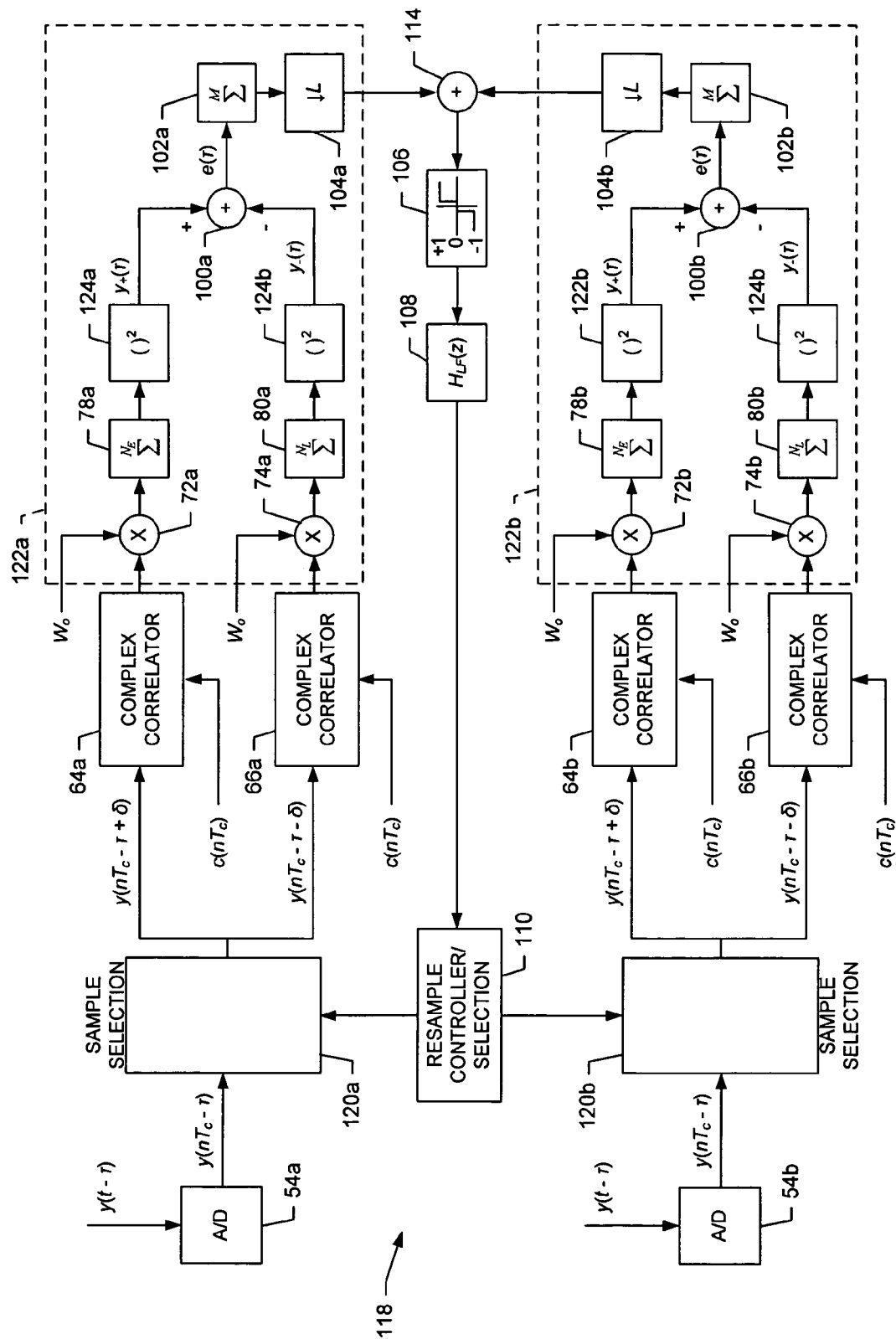
Figure 9:
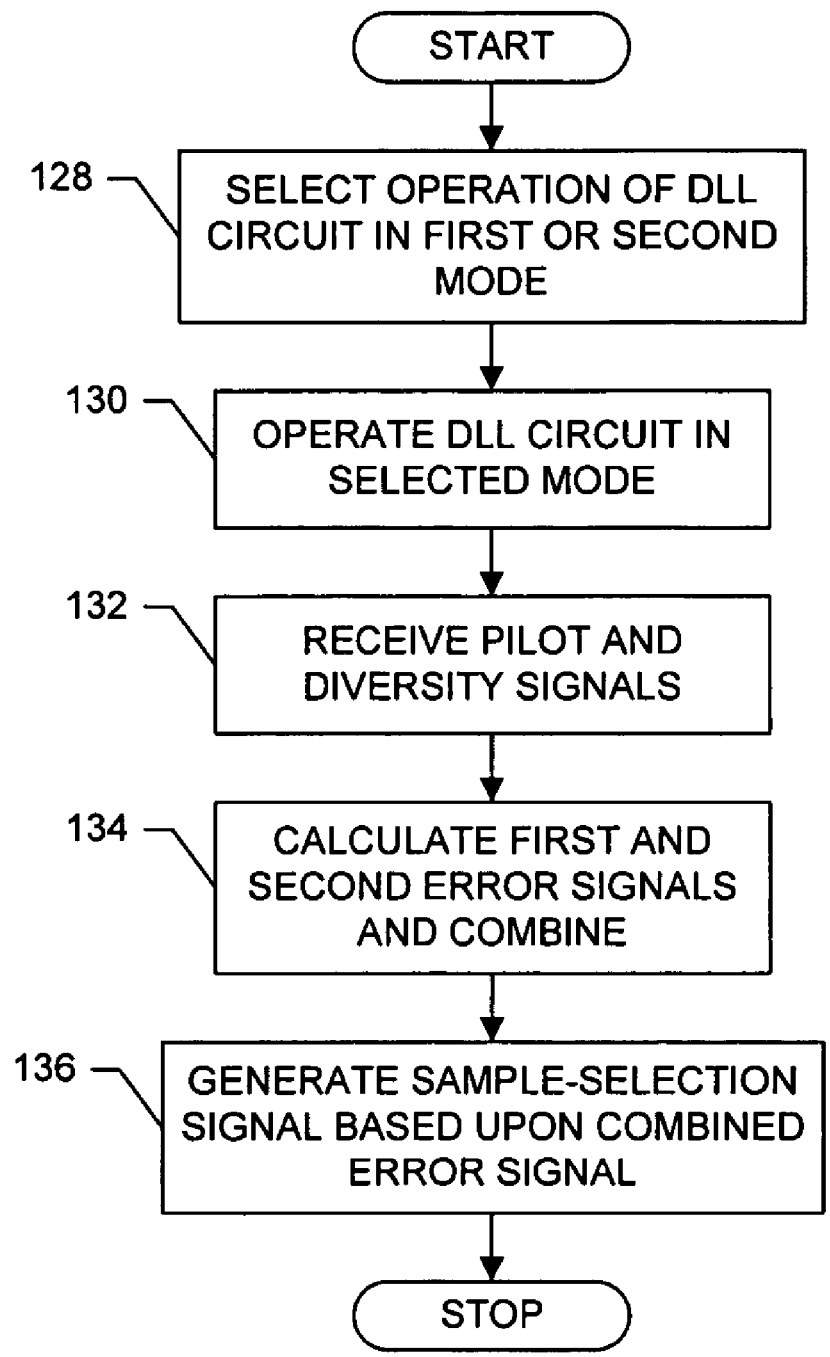

Having thus described the invention in general terms, reference will now be made to the accompanying drawings, which are not necessarily drawn to scale, and wherein:

FIG. 1 illustrates a schematic block diagram of a wireless communication system including a terminal, according to one embodiment of the present invention;

FIG. 2 is a schematic functional block diagram of a system that includes a delay lock loop circuit operating in a coherent mode, in accordance with one embodiment of the present invention;

FIG. 3 is a schematic block diagram of a delay lock loop circuit in a coherent system, in accordance with one embodiment of the present invention;

FIG. 4 is a schematic functional block diagram of a system that includes a delay lock loop circuit operating in a transmit diversity mode, in accordance with another embodiment of the present invention;

FIG. 5 is a schematic block diagram of a delay lock loop circuit in a transmit diversity system, in accordance with one embodiment of the present invention;

FIG. 6 is a schematic functional block diagram of a system that includes a delay lock loop circuit operating in a receive diversity mode, in accordance with yet another embodiment of the present invention;

FIG. 7 is a schematic block diagram of a delay lock loop circuit in a receive diversity system, in accordance with one embodiment of the present invention;

FIG. 8 is a schematic block diagram of a delay lock loop circuit configured to receive discontinuous signals while operating in a receive diversity mode, in accordance with a further embodiment of the present invention; and FIG. 9 is a flowchart illustrating various steps in a method of synchronizing a receiver in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of wireless communications system 10 including a terminal 12 that would benefit from the present invention is provided. As explained below, the terminal may comprise a mobile telephone. It should be understood, however, that such a mobile telephone is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of voice and text communications systems, can readily employ the present invention. In addition, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

The communication system 10 provides for radio communication between two communication stations, such as a base station (BS) 14 and the terminal 12, by way of radio links formed therebetween. The terminal is configured to receive and transmit signals to communicate with a plurality of base stations, including the illustrated base station. The communication system can be configured to operate in accordance with one or more of a number of different types of spread-spectrum communication, or more particularly, in accordance with one or more of a number of different types of spread spectrum communication protocols. More particularly, the communication system can be configured to operate in accordance with any of a number of 1 G, 2 G, 2.5 G and/or 3 G communication protocols or the like. For example, the communication system may be configured to operate in accordance with 2 G wireless communication protocols IS-95 (CDMA), IS-98 and/or IS-2000 (cdma2000). Also, for example, the communication system may be configured to operate in accordance with 3 G wireless communication protocols such as Universal Mobile Telephone System (UMTS) employing Wideband Code Division Multiple Access (WCDMA) radio access technology. Further, for example, the communication system may be configured to operate in accordance with enhanced 3 G wireless communication protocols such as 1X-EVDO (TIA/EIA/IS-856) and/or 1X-EVDV. It should be understood that operation of the embodiment of the present invention is similarly also possible in other types of radio, and other, communication systems. Therefore, while the following description may describe operation of an embodiment of the present invention with respect to the aforementioned wireless communication protocols, operation of an embodiment of the present invention can analogously be described with respect to any of various other types of wireless communication protocols, without departing from the spirit and scope of the present invention.

The base station 14 is coupled to a base station controller (BSC) 16. In turn, the base station controller is coupled to a mobile switching center (MSC) 18. The MSC is coupled to a network backbone, here a PSTN (public switched telephonic network) 20. In turn, a correspondent node (CN) 22 is coupled to the PSTN. A communication path is formable between the correspondent node and the terminal 12 by way of the PSTN, the MSC, the BSC and base station, and a radio link formed between the base station and the terminal. Thereby, the communications, of both voice data and non-voice data, are effectual between the CN and the terminal. In the illustrated, exemplary implementation, the base station defines a cell, and numerous cell sites are positioned at spaced-apart locations throughout a geographical area to define a plurality of cells within any of which the terminal is capable of radio communication with an associated base station in communication therewith.

As shown, in addition to one or more antennas 24, the terminal 12 of one embodiment of the present invention can include a transmitter 26, receiver 28, and controller 30 or other processor that provides signals to and receives signals from the transmitter and receiver, respectively. These signals include signaling information in accordance with the communication protocol(s) of the wireless communication system, and also user speech and/or user generated data. In this regard, the terminal can be capable of communicating in accordance with one or more of a number of different wireless communication protocols, such as those indicated above. Although not shown, the terminal can also be capable of communicating in accordance with one or more wireline and/or wireless networking techniques. More particularly, for example, the terminal can be capable of communicating in accordance with local area network (LAN), metropolitan area network (MAN), and/or a wide area network (WAN) (e.g., Internet) wireline networking techniques. Additionally or alternatively, for example, the terminal can be capable of communicating in accordance with wireless networking techniques including wireless LAN (WLAN) techniques such as IEEE 802.11, and/or WiMAX techniques such as IEEE 802.16 or the like.

It is understood that the controller 30 includes the circuitry required for implementing the audio and logic functions of the terminal 12. For example, the controller may be comprised of a digital signal processor device, a microprocessor device, and/or various analog-to-digital converters, digital-to-analog converters, and other support circuits. The control and signal processing functions of the terminal are allocated between these devices according to their respective capabilities. The controller can additionally include an internal voice coder (VC) 30a, and may include an internal data modem (DM) 30b. Further, the controller may include the functionality to operate one or more software applications, which may be stored in memory (described below).

The terminal 12 can also include a user interface including a conventional earphone or speaker 32, a ringer 34, a microphone 36, a display 38, and a user input interface, all of which are coupled to the controller 18. The user input interface, which allows the terminal to receive data, can comprise any of a number of devices allowing the terminal to receive data, such as a keypad 40, a touch display (not shown) or other input device. In embodiments including a keypad, the keypad includes the conventional numeric (0-9) and related keys (#, *), and other keys used for operating the terminal. Although not shown, the terminal can include one or more means for sharing and/or obtaining data (not shown).

In addition, the terminal 12 can include memory, such as a subscriber identity module (SIM) 42, a removable user identity module (R-UIM) or the like, which typically stores information elements related to a mobile subscriber. In addition to the SIM, the terminal can include other removable and/or fixed memory. In this regard, the terminal can include volatile memory 44, such as volatile Random Access Memory (RAM) including a cache area for the temporary storage of data. The terminal can also include other non-volatile memory 46, which can be embedded and/or may be removable. The non-volatile memory can additionally or alternatively comprise an EEPROM, flash memory or the like. The memories can store any of a number of software applications, instructions, pieces of information, and data, used by the terminal to implement the functions of the terminal.

Reference is now made to FIG. 2, which illustrates a functional block diagram of the system 10 of FIG. 1 in accordance with one embodiment of the present invention. More particularly, FIG. 2 illustrates a functional block diagram of the system including a delay lock loop circuit operating in a coherent mode. In such a coherent mode, the base station 14 includes a transmitter 50 and a transmit antenna 52. The transmitter prepares a signal stream, such as by spreading and scrambling an input modulated signal stream, and provides the signal stream to the transmit antenna. The transmit antenna transmits the signal stream $I_{or}$ through a one-path fading downlink channel to an antenna 24 coupled to the receiver 28 of a terminal 12 (although the channel may have more than one path). As the signal stream is transmitted through the fading downlink channel, the signal stream experiences signal fading, as represented by a fading coefficient $\sqrt{a}$ (a being the fading channel (power) gain). In addition, the signal stream is affected by additive noise represented by an additive noise variance $I_{oc}$, with the faded and noise affected signal stream $I_o$ being received by the antenna 24 coupled to the receiver of the terminal.

Following receipt by the receiver 28, the received signal stream is applied to an analog-to-digital (A/D) converter 54 that converts the received signals to digital signals for further processing. From the A/D converter, then, the digital signals are provided to a rake receiver 56. Thereafter, the rake receiver can process the digital signals, such as by despreading and demodulating the digital signals, for use by the terminal 12.

For the data to be successfully communicated between the transmitter 50 of the base station 14 and the receiver 28 of the terminal 12, the respective elements must be in synchronization with one another. Thus, to effectively process digital signals, the terminal monitors a pilot signal generated by the base station pursuant to synchronization operations to synchronize the terminal to the remaining portion of the system 10. Each finger of the rake receiver 56, then, includes a delay lock loop (DLL) circuit 58 for placing, and maintaining, the receiver of the terminal in synchronization with the transmitter of the base station. More particularly, the delay lock loop circuit, responsive to values of representations of the pilot signal, synchronizes the receiver with the pilot signal, and, in turn, the base station. Although the receiver of the terminal is shown and described herein as including a delay lock loop circuit, it should be understood that the base station and/or a number of other elements of the system may additionally or alternatively include a similar delay lock loop circuit. It should be further understood that within a respective entity, the delay lock loop circuit may be embodied in any of a number of different manners including, for example, hardware, firmware and/or software.

During synchronization operations, the delay lock loop circuit 58 first operates in an acquisition mode in which the initial timing is only coarsely (i.e., generally) known. When in the acquisition mode, the delay lock loop circuit attempts to quickly align the receiver 28 of the terminal 12 with the transmitter 50 of the base station 14, from which data may be communicated during operation of the communication system 10. Subsequently, the delay lock loop circuit is operated in a tracking mode, such as when the receiver is operated near the correct timing epoch. Operation of the delay lock loop circuit in the tracking mode further reduces timing error between the transmitter and the receiver.

The delay lock loop circuit 58 of an embodiment of the present invention is reconfigurable between the acquisition and tracking modes and, also, is input-signal insensitive. The delay lock loop circuit is therefore more robust and behaves in a deterministic manner, irrespective of the input signal applied to the delay lock loop circuit. Additionally, as the delay lock loop circuit forms a control loop, the circuit has a loop bandwidth. The loop bandwidth is controlled, in the exemplary implementation, with a loop filter. As the control loop may be insensitive to the signal amplitude of input signals applied to the delay lock loop circuit, the loop filter design is simplified and the circuitry performs in a deterministic manner irrespective of the input signal level. Signal normalization of the input signal is not required as the circuit is signal-amplitude insensitive.

Reference is now made to FIG. 3 which more particularly illustrates the delay lock loop circuit 58 operating in the coherent mode, in accordance with one embodiment of the present invention. Again, as shown, the A/D converter 54 of the receiver 28 receives pilot signal $y(t-\tau)$ contained in a pilot signal delivered to the receiver. In the representation of the pilot signal, t represents time and $\tau$ represents the relative timing error (fraction of a chip period, $T_c$) between the transmitter 50 and the receiver. The A/D converts the pilot signal into digital signals $y(nT_c-\tau)$, n=0, 1, 2, . . . , and provides the digital signals to a sample selection element 60, which selects sampled signals from the digital signals applied thereto. The sampled signals selected by the sample selection element include on-time signals, as well as early signals and late signals that are offset from the on-time signals by $+\delta$ and $-\delta$, respectively. That is, the sampled signals output from the sample selection element include on-time signals $y(nT_c-\tau)$, early signals $y(nT_c-\tau+\delta)$ and late signals $y(nT_c-\tau-\delta)$. Thus, as used herein, the on-time signals may be referred to as zero offset signals, with the early and late signals being referred to as positive and negative offset signals, respectively.

Following the sample selection element 60, the sampled signals extend to complex correlators 62, 64 and 66, each of which also receive pseudo-noise (PN) sequences $c(nT_c)$. Using the PN sequences, the correlators despread the sampled signals, including the on-time, early and late signals. The despread signals are then applied to an arrangement 68. The arrangement includes mixer circuits 70, 72 and 74 that mix the despread signals with Walsh cover codes $W_o$, and thereafter provide the mixed signals to integrators 76, 78 and 80, respectively. Upon receiving the mixed signals, the integrators perform integrations over selected numbers of samples $N_O$, $N_E$, and $N_L$, where the sample lengths are selectable. In this regard, integrator 76 performs integrations of the mixed, despread on-time signals over $N_O$ samples, integrator 78 performs integrations of the mixed, despread early signals over $N_E$ samples, and integrator 80 performs integrations of the mixed, despread late signals over $N_L$ samples.

The integrated values formed by integrators 78 and 80 are provided to delay elements 82 and 84, respectively. The delay elements delay the values applied thereto by delay lengths d. Delayed, integrated values $y+(\tau)$ and $y-(\tau)$ are thereafter applied to mixers 86 and 88, respectively.

The integrated values formed by integrator 76 of the on-time path are applied to a filter 90 that exhibits a selectable filter transfer function, $H_o(z)$. Following the filter, filtered values are conjugated by a conjugator 92 and then delayed by a delay element 94, where the delay element exhibits a delay of D. Once delayed by the delay period D, the values are also applied to mixers 86 and 88 of the early and late signal paths, respectively. The mixers are separately operable to form mixed signals, of which the real component portions thereof are passed by elements 96 and 98 and applied to a summation element 100. The summation element, in turn, forms difference values $e(\tau)$ that represent error signals. Following the summation element, the error signals are integrated by integrator 102 over a selectable number of samples, M. The integrated values are down-sampled by a down-sampler 104 and hard-limited by a sign detector 106.

Hard-limited values formed by the sign detector 106 are provided to a loop filter 108 that exhibits selected filter characteristics including a filter bandwidth and is represented by a transfer function $H_{LF}(z)$. The filtered values formed by the loop filter are then provided to a resample controller/selector 110 that derives or otherwise generates a control signal in accordance with a hypothesis testing technique. The controller signal is thereafter applied to the sample generator 60 where the control signal forms a sample-selection signal. That is, values of the control signal selectively alter operation of the sample generator.

As indicated above with respect to FIG. 2, when the delay lock loop circuit 58 operates in the coherent mode, the base station 14 includes a transmit antenna 52 for transmitting signal streams through a fading downlink channel to an antenna 24 coupled to a terminal 12. As will be appreciated, however, emerging wireless technologies such as 802.11, IS-95, IS-2000, 1X-EVDO and WCDMA provide for a multi-antenna, transmit mode (transmit diversity mode) and/or receive mode (receive diversity mode) whereby the base station and/or terminal communicate by means of more than one antenna. For example, the IS-2000 protocol (from Revision A) includes a transmit diversity mode where the base station transmits user information by means of two transmit antennas. In addition, for example, a number of commercially available chip sets for terminals now include multiple receive antennas. And future versions of the spread spectrum standards are sure to include both transmit and receive diversity capabilities.

Therefore, in accordance with other embodiments of the present invention, the delay lock loop circuit is configured to utilize information of transmit diversity signals and/or receive diversity signals to thereby improve the overall delay lock loop performance. As explained below with respect to operating in a transmit diversity mode, the transmit diversity pilot and the common pilot are combined, whereas the pilot signals from multiple antennas are combined in the receive diversity mode.

Reference is now made to FIG. 4, which illustrates a functional block diagram of the system 10 of FIG. 1 including a delay lock loop circuit 112 operating in a transmit diversity mode, in accordance with one embodiment of the present invention. In the transmit diversity mode, the base station 14 includes a transmitter 50 and a plurality of a transmit antennas, where two transmit antennas 52a and 52b are shown and described herein. Similar to before, the transmitter prepares a signal stream, and provides the signal stream to the transmit antennas. The transmit antennas each transmit a respective signal stream $I_{or1}$ and $I_{or2}$ through a one-path fading downlink channel to an antenna 24 coupled to the receiver 28 of a terminal 12 (although the channel may have more than one path). As the signal stream is transmitted through the fading downlink channel, the signal stream experiences signal fading. That is, as the signal stream from the first transmit antenna 52a is transmitted through the fading downlink channel, the signal stream experiences signal fading, represented by fading coefficient $\sqrt{a_1}$. Similarly, as the signal stream from the second transmit antenna 52b is transmitted through the fading downlink channel, the signal stream experiences signal fading, represented by fading coefficient $\sqrt{a_2}$. In addition to experiencing fading, the signal streams from the antennas are affected by additive noise (i.e., $I_{oc}$). The resulting faded and noise affected signal stream $I_o$ is thereafter received by the antenna 24 coupled to the receiver of the terminal, where the signal stream is processed.

Referring now to FIG. 5, a delay lock loop circuit 112 is shown for the transmit diversity mode, in accordance with one embodiment of the present invention. As before, the A/D converter 54 of the receiver 28 receives pilot signal $y(t-\tau)$, and converts the pilot signal into digital signals $y(nT_c-\tau)$. The digital signals are then, as before, provided to a sample selection element 60 that selects on-time, early and late sampled signals from the digital signals applied thereto. Further, as before, the sampled signals then extend to complex correlators 62, 64 and 66 for dispreading the sampled signals using PN sequences $c(nT_c)$. The despread signals are then applied to a first arrangement 68a that, like arrangement 68 of FIG. 3, includes mixer circuits that mix the despread signals with Walsh cover codes $W_o$. The first arrangement then operates in the same manner as arrangement 68 to recover the pilot signals. Unlike delay lock loop circuit 58 in the coherent mode, however, delay lock loop circuit 112 in the transmit diversity mode includes a second arrangement 68b that includes mixer circuits that mix the despread signals with Walsh cover codes $W_{16}$. The second arrangement 68b then operates on the mixed signals much in the same manner as arrangement 68, and thus the first arrangement 68a, to recover the transmit diversity pilot signals. In the transmit diversity mode, then, the first and second arrangements 68a and 68b are capable of determining error signals $e(\tau)$ for both the pilot channel and the transmit diversity pilot channel.

More particularly, the on-time pilot signal $P_1^O$ at the output of a finger for the pilot channel (passed to and processed by the first arrangement 68a) can be represented as follows:

$$P_1^O = N_O\sqrt{2a_1 E_{cp} R(t)} + n_{P1} + jn_{PQ},\ (n_{P1}, n_{P1}, n_{PQ}) = \text{Gauss}(0, \sqrt{N_O I_{oc}}) \quad (1)$$

where $E_{cp}$ represents the pilot channel power, $I_{oc}$ represents additive noise variance, $N_O$ represents the pilot signal correlation length, and $a_1$ represents the fading channel (power) gain. Also in equation (1), $R(t)$ represents the cross-correlation function of the received pulse shape (received pulse shape is the convolution of the TX pulse shaping filter and RX receive filters), and $n_{P1}$ and $n_{PQ}$ represent noise samples. Further, Gauss(m, s) represents the normal (Gaussian) distribution with a mean m and standard deviation s where, in equation (1), $(n_{P1}, n_{PQ})$=Gauss(m,s) indicates that the noise samples are random variables having a normal distribution with mean m (i.e., 0) and standard deviation s (i.e., $\sqrt{N_O I_{oc}}$). Similarly the early pilot signal $P_1^E$ and late pilot signal $P_1^L$ for the pilot channel can be represented as shown in the following equations (2) and (3):

$$P_1^E = N_E\sqrt{2a_1 R(t-\tau) E_{cp}} + n_{P1} + jn_{PQ},\ (n_{P1}, n_{PQ}) = \text{Gauss}(0, \sqrt{N_E I_{oc}}) \quad (2)$$

$$P_1^L = N_L\sqrt{2a_1 R(t+\tau) E_{cp}} + n_{P1} + jn_{PQ},\ (n_{P1}, n_{PQ}) = \text{Gauss}(0, \sqrt{N_L I_{oc}}) \quad (3)$$

where $\tau$, as before, represents the relative timing error.

In the first arrangement 68a, the error signal $e_1(\tau)$ is calculated as the difference of the early/late pilot signals $P_1^E$ and $P_1^L$ multiplied by the complex conjugate of the on-time pilot signal $P_1^O$. Ignoring noise terms $n_{P1}$ and $n_{PQ}$, and setting $N_E = N_L = N$, the error signal $e_1$ from the first arrangement 68a can be calculated as follows:

$$e_1 = (P_1^E - P_1^L)(P_1^O)^* \quad (4)$$
$$= N\sqrt{2a_1 E_{cp}}\left(\sqrt{R(t-\tau)} - \sqrt{R(t+\tau)}\right)\left(N_O\sqrt{2a_1 E_{cp} R(t)}\right)^*$$
$$= 2NN_O a_1 E_{cp}\left(\sqrt{R^*(t) R(t-\tau)} - \sqrt{R^*(t) R(t+\tau)}\right)$$

where $(\ )^*$ denotes a complex conjugate operation. In the second arrangement 68b, the transmit diversity pilot signal $P_2^L$ and early and late pilot signals $P_2^E$ and $P_2^L$ can be represented in a manner similar to that of equations (2), (3) and (4), respectively. Like in the first arrangement, the error signal $e_2(\tau)$ can be calculated in the second arrangement 68b is calculated as the difference of the early/late pilot signals $P_2^E$ and $P_2^L$ multiplied by the complex conjugate of the on-time pilot signal $P_2^O$. That is, the error signal in the second arrangement 68b can be calculated in the following equation (6), much in the same manner as in equation (4):

$$e_2 = N\sqrt{2a_2 E_{cp}^{td}}\left(\sqrt{R(t-\tau)} - \sqrt{R(t+\tau)}\right)\left(N_O\sqrt{2a_2 E_{cp}^{td} R(t)}\right)^* \quad (5)$$
$$= 2NN_O a_2 E_{cp}^{td}\left(\sqrt{R^*(t) R(t-\tau)} - \sqrt{R^*(t) R(t+\tau)}\right)$$

where $E_{cp}^{td}$ is the energy of the transmit diversity pilot, which is typically, but need not be, different than the energy of the pilot signal $E_{cp}$.

As also shown in FIG. 5, following the first and second arrangements 68a and 68b, the error signals $e_1$ and $e_2$ for the pilot channel and transmit diversity pilot channel are applied to a summation element 114 that forms a combined error signal e. In this regard, from equations (4) and (5), the combined error signal e of delay lock loop circuit 112 (operating in the transmit diversity mode) can be calculated as follows:

$$e = e_1 + e_2 = 2NN_O(\sqrt{R^*(t)R(t-\tau)} - \sqrt{R^*(t)R(t+\tau)})(a_1 E_{cp} + a_2 E_{cp}^{td}) \quad (6)$$

As can be seen in equation (6), the combined error signal e is proportional to the square of the fading channel coefficients $\sqrt{a_1}$ and $\sqrt{a_2}$. This implies that the error, which is proportional to the channel amplitude, is weighted by the channel amplitude. Thus, summation element 114 can combine the error signals from the pilot channel $e_1$ and the transmit diversity pilot channel $e_2$ by performing an addition operation to thereby yield a maximal ratio combining of the two error signals. Communicating in accordance with protocols such as IS-2000, the power ratio of the pilot channel to the transmit diversity pilot channel is known to the terminal 12 through signaling with the base station 14. Thus, there may be no need to compensate for a power difference between the pilot channel and transmit diversity pilot channel when the error signals $e_1$ and $e_2$ are combined as described above with respect to equations (4), (5) and (6). In this regard, maximum ratio combining of the signals can be obtained without knowledge of the relative powers of the two pilot signals.

As further shown in FIG. 5, after summing the error signals from the pilot channel $e_1$ and the transmit diversity pilot channel $e_2$, delay lock loop circuit 112 can process the combined error signal e much in the same manner as delay lock loop circuit 58 processes error signals. That is, the combined error signals are hard-limited by a sign detector 106, and thereafter provided to a loop filter 108 that exhibits selected filter characteristics including a filter bandwidth and is represented by a transfer function $H_{LF}(z)$. The filtered values formed by the loop filter are then provided to a resample controller/selector 110 that derives or otherwise generates a control signal in accordance with a hypothesis testing technique. The controller signal is thereafter applied to the sample generator 60 where the control signal forms a sample-selection signal.

In the receive diversity mode, as shown in the functional block diagram of FIG. 6, the base station 14 includes a transmitter 50 and a transmit antenna 52 that are adapted to operate in a manner similar to that of the coherent mode. In contrast to the coherent mode, however, the terminal 12 in the receive diversity mode includes a plurality of receive antennas, where two receive antennas 24a and 24b are shown and described herein. Similar to the coherent mode, the transmitter in the receive diversity mode prepares a signal stream and provides the signal stream to the transmit antenna, which transmits the signal stream $I_{or}$ through a one-path fading downlink channel to the receive antennas (although the channel may have more than one path). While in the downlink channel, the signal stream experiences signal fading, represented by fading coefficient $\sqrt{a_1}$ for the first receive antenna 24a and fading coefficient $\sqrt{a_2}$ for the second receive antenna 24b. The faded signal streams are further affected by additive noise (i.e., $I_{oc}$) such that the resulting faded and noise affected signal streams $I_{o1}$ and $I_{o2}$ are thereafter received by the receive antennas coupled to the receiver of the terminal, where the signal stream is processed by A/D converters 54a, 54b, rake receivers 56a, 56b, and a delay lock loop circuit 116.

Referring now to FIG. 7, the delay lock loop circuit 116 for the receive diversity mode is shown in accordance with one embodiment of the present invention. Similar to before, the A/D converters 54a, 54b of the receiver 28 receive pilot signals $y(t-\tau)$ for the pilot channel and the receive diversity pilot channel, and convert the pilot signals into digital signals $y(nT_c-\tau)$. The digital signals are provided to a respective sample selection element 60a, 60b that selects on-time, early and late sampled signals from the digital signals applied thereto. Then, the sampled signals are extended to respective complex correlators 62a, 62b, 64a, 64b, and 66a, 66b for dispreading the respective sampled signals using PN sequences $c(nT_c)$. The respective despread signals are then applied to the first and second arrangements 68a and 68b each of which, like arrangement 68 of FIG. 3, includes mixer circuits that mix the despread signals with Walsh cover codes $W_o$. The first and second arrangements then operate in the same manner as arrangement 68 to recover the pilot signals. Unlike delay lock loop circuit 58 in the coherent mode, delay lock loop circuit 116 in the receive diversity mode includes a second arrangement 68b. And unlike delay lock loop circuit 112 in the transmit diversity mode, the delay lock loop circuit 116 in the receive diversity mode includes separate A/D converters 42, sample selection elements 60, complex correlators 62, 64 and 66, and arrangements 68 for processing the pilot signal and receive diversity pilot signal from receive antennas 24a and 24b, respectively.

Similar to the transmit diversity mode, the first and second arrangements 68a and 68b in the receive diversity mode are capable of determining error signals $e(\tau)$ for both the pilot channel and the receive diversity pilot channel, and applying the error signals $e_1$ and $e_2$ for the pilot channel and receive diversity pilot channel to a summation element 114 that forms a combined error signal e. Thus, in the receive diversity mode, the on-time pilot signals $P_1^O$ and $P_2^O$ at the output of a finger for the pilot channel (passed to and processed by the first arrangement 68a) and the receive diversity pilot channel (passed to and processed by the second arrangement 68b), respectively, can be represented in a manner similar to that of equation (1) above. Likewise, the early pilot signals $p_1^E$ and $P_2^E$ and late pilot signals $P_1^L$ and $P_2^L$ for the pilot channel and receive diversity pilot channel can be represented in a manner similar to that of equations (2) and (3).

The pilot channel error signal $e_1$ in the receiver diversity mode can therefore be represented in a manner similar to that of equation (4), as can the receive diversity pilot channel error signal $e_2$ with respect to equation (5) when the transmit diversity pilot channel power $E_{cp}^{td}$ is set equal to the receive diversity pilot channel power $E_{cp}^{rxd}$ (i.e., $E_{cp}^{td}=E_{cp}^{rxd}$). Further, when the transmit diversity pilot channel power is set equal to the receive diversity pilot channel power, the combined error signal e of delay lock loop circuit 116 can be represented in a manner similar to that of equation (6). And when the pilot channel power $E_{cp}$ is set equal to the transmit and receive diversity pilot channel powers $E_{cp}^{td}$ and $E_{cp}^{rxd}$ (i.e., $E_{cp}=E_{cp}^{td}=E_{cp}^{rxd}$), the combined error signal can be further simplified as shown in the following equation (7):

$$\begin{aligned} e &= e_1 + e_2 \\ &= 2NN_O\left(\sqrt{R^*(t)R(t-\tau)} - \sqrt{R^*(t)R(t+\tau)}\right)(a_1 E_{cp} + a_2 E_{cp}^{rxd}) \\ &= 2NN_O E_{cp}\left(\sqrt{R^*(t)R(t-\tau)} - \sqrt{R^*(t)R(t+\tau)}\right)(a_1 + a_2) \end{aligned} \quad (7)$$

Further, as shown in FIG. 7, after summing the error signals from the pilot channel $e_1$ and the receive diversity pilot channel $e_2$, delay lock loop circuit 116 can process the combined error signal e in a manner similar to that of delay lock loop circuits 58 and 112. That is, the combined error signals are hard-limited by a sign detector 106, and thereafter provided to a loop filter 108 that exhibits selected filter characteristics including a filter bandwidth and is represented by a transfer function $H_{LF}(z)$. The filtered values formed by the loop filter are then provided to a resample controller/selector 110 that derives or otherwise generates control signals in accordance with a hypothesis testing technique. The controller signals are thereafter applied to both of the sample generators 60a and 60b where the control signals form sample-selection signals.

As shown and described above, delay lock loop circuits 58, 112 and 116 are particularly useful for receiving continuous reference (pilot) signals. As will be appreciated, however, in various instances the reference signal received by the receiver 28 is discontinuous. For example, in accordance with wireless communication protocols such as 1X-EVDO, the reference signals are time-division multiplexed with a traffic signal, and are therefore discontinuous. Thus, in accordance with embodiments of the present invention, delay lock loop circuits 58, 112 and 116 can be configured for use with discontinuous reference signals. In this regard, reference will now be made to FIG. 8, which illustrates a block diagram of delay lock loop circuit 118 configured to receive discontinuous signals while operating in a receive diversity mode, like delay lock loop circuit 116. It should be understood, however, that delay lock loop circuit 58 and/or delay lock loop circuit 112 can be similarly configured to receive discontinuous reference signals, without departing from the spirit and scope of the present invention.

As shown in FIG. 8, similar to delay lock loop circuit 116 of FIG. 7, delay lock loop circuit 118 includes A/D converters 54a, 54b that receive pilot signals y(t−τ) for the pilot channel and the receive diversity pilot channel, and convert the pilot signals into digital signals y(nT$_c$−τ). The digital signals are provided to respective sample selection elements 120a and 120b. In contrast to the sample selection elements 60a, 60b of delay lock loop circuit 116 which select on-time, early and late sampled signals, sample selection elements 120a, 120b select early and late sampled signals from the digital signals applied thereto. The sampled signals are then extended to respective complex correlators 64a, 64b and 66a, 66b for dispreading the respective sampled signals using PN sequences c(nT$_c$). The respective despread signals are then applied to first and second arrangements 122a and 122b each of which, like arrangement 68 of FIG. 3, includes mixer circuits 72a, 72b and 74a, 74b that mix the despread signals with Walsh cover codes W$_o$.

Following mixer circuits 72a, 72b and 74a, 74b, the mixed signals are provided to integrators 78a, 78b and 80a, 80b, respectively. Upon receiving the mixed signals, the integrators perform integrations over selected numbers of samples $N_E$, and $N_L$, where the sample lengths are selectable. In this regard, integrators 78a, 78b perform integrations of the mixed, despread early signals over $N_E$ samples, and integrators 80a, 80b perform integrations of the mixed, despread late signals over $N_L$ samples. The integrated early pilot signals $P_1^E$ and $P_2^E$ and late pilot signals $p_1^L$ and $p_2^L$ for the pilot channel and receive diversity pilot channel are then provided to elements 124a, 124b and 126a, 126b for calculating the powers of the early and late signals, respectively. The early and late signal power values y+(τ) and y−(τ) are thereafter applied to respective summation elements 100a, 10b. The summation elements, in turn, form difference values $e_1(τ)$ and $e_2(τ)$ that represent error signals. Following the summation element, the error signals are integrated by integrators 102a, 102b over a selectable number of samples (M), and then down-sampled by down-samplers 104a, 104b. Then, in a manner similar to that of delay lock loop circuit 116, the down-sampled error signals are provided to summation element 114 that forms a combined error signal e.

More particularly, consider that the early pilot signal $P_1^E$ and late pilot signal $P_1^L$ for the pilot channel can be represented as in equations (2) and (3) above, with the receive diversity pilot channel capable of being similarly represented. In such an instance, the error signal $e_1$ formed by summation element 100a can be calculated as follows:

$$e_1 = (P_1^E)^2 - (P_1^L)^2 = (P_1^E)^*(P_1^E) - (P_1^L)^*(P_1^L) \quad (8)$$
$$= 2Na_1 E_{cp}(\sqrt{R(t-\tau)^* R(t-\tau)} - \sqrt{R(t+\tau)^* R(t+\tau)})$$

where ()* denotes complex conjugate operation. Then, similarly calculating and representing the error signal $e_2$ formed by summation element 10b, the combined error signal e formed by summation element 114 can be calculated as follows:

$$e_1+e_2=2N(a_1+a_2)E_{cp}(\sqrt{R(t-\tau)^*R(t-\tau)}-\sqrt{R(t+\tau)^*R(t+\tau)}) \quad (9)$$

As can be seen from equation (9), the combined error signal is directly proportional to the square of the channel fading coefficients $\sqrt{a_1}$ and $\sqrt{a_2}$. Thus, as shown, the error signals can be combined using maximum ratio combining, as is typically desired.

As shown in FIGS. 2, 4 and 6, the delay lock loop circuits 58, 112, 116 and 118 each further include a selector 126 that operates to select values of selectable parameters of the delay lock loop circuit, as indicated above, dependent upon the mode in which the circuit is to be operated. In this regard, the selector can be coupled to the integrators 76, 78 and 80, the filters 90 and 108, and the delay elements 82, 84 and 94 (shown in FIGS. 2, 5, 7 and 8). Through appropriate selection by the selector of the operating parameters of such elements, the delay lock loop circuit is caused to be selectively operated in the acquisition or tracking mode.

In the acquisition mode, the values of $N_O$, $N_E$, and $N_L$ which define the bounds of the integrations performed by the integrators 76, 78 and 80, respectively, are selected to be small because the phase of the pilot and diversity signals is potentially changing rapidly due to high frequency offset. And the value of M, forming the bounds of the integration performed by integrator 102, is selected to be large to optimize the signal-to-noise ratio of the error signal e(τ) provided thereto, prior to sign detection by the detector 106. Additionally, in the acquisition mode, the bandwidth of filter 90 is selected to be wide enough so that filtering of the on-time pilot and diversity signals, samples of which are formed on the on-time signal paths, with high frequency content is minimized. In the exemplary implementation, the transfer function equals one (i.e., $H_o(z)=1$) such that no filtering is performed by filter 90 when the circuit is in the acquisition mode.

In the tracking mode, filter 90 is operated to optimize the signal-to-noise ratio of the on-time pilot and diversity signals prior to phase correction as the anticipated frequency offset is typically moderate compared to the offset when in the acquisition mode. The values of $N_O$, $N_E$, and $N_L$ forming the bounds of the integrations performed by the integrators 76, 78 and 80 are optimized, based upon design requirements.

In the acquisition mode, filter 108 operates such that the bandwidth of the filter is wide enough to be able to track clock drift caused by potentially high frequency offset. When operated in the tracking mode, filter 108 is operated to optimize the jitter when the delay lock loop circuit is tracking a slowly-moving finger position of the receiver of which the delay lock loop circuit forms a portion.

The values of the delays d and D are derived such that the on-time pilot and diversity signals used for phase correction is time-aligned with the early/late pilot and diversity signals, given the constraint that there is no correlation between the on-time and early/late pilot and diversity signals. In the event of perfect alignment, d equals D plus the delay of filter 90. A correlation also exists between the on-time and early pilot and diversity signals ($p_1^O$, $p_1^E$ and $P_2^O$, $p_2^E$), and between the on-time and late signals ($p_1^O$, $P_1^L$ and $P_2^O$, $P_2^L$). In the exemplary implementation, d equals (D−1) delay of filter 90 when the circuit is operated in the tracking mode. In the acquisition mode, d equals one and D equals zero if the transfer function of filter 90 equals one. Additionally, in either of the operating modes of the delay lock loop circuit, the value of L is designed for the filter transfer function of filter 108 to yield the optimal combination based upon the design constraints of the circuit, such as the feedback update rate or complexity.

FIG. 9 illustrates various steps in a method of synchronizing signals at a receiver (e.g., receiver 28) in accordance with an embodiment of the present invention, where the synchronization may be effectuated by controlling sample selection of sampled representations of the receive signal through operation of a delay lock loop circuit (e.g., delay lock loop circuit 58, 112, 116 or 118). As shown in block 128, the method includes alternately selecting operation of the delay lock loop circuit in a first mode (e.g., acquisition mode) and at least a second mode (e.g., tracking mode). Then, and as shown in block 130, the delay lock loop circuit is operated in a selected one of the first and second modes, where operation is responsive to values of a sample-selection signal. The sample selection signal is calculated over a selected sampling period, and is of a value responsive to the sampled representations of the receive signal over sample period lengths. Each sampled representation is represented in terms of a zero offset (on-time signal), positive offset (early signal) and a negative offset (late signal). The selected sampling period is of a first sample period length when the first mode is selected and of a second sample period length when the second mode is selected.

As shown more particularly in block 132, during operation, the delay lock loop circuit (e.g., delay lock loop circuit 58, 112, 116 or 118) receives pilot and diversity signals (transmit diversity and/or receive diversity signals). The delay lock loop circuit then calculates a first error signal $e_1$ and a second error signal $e_2$ based upon representations of the pilot signal and diversity signal, respectively, and combines the first and second error signals, as shown in block 134. In instances wherein the received signals are continuous, the first and second error signals can be calculated based upon amplitudes of the zero offset, positive offset and negative offset of the pilot signal and diversity signal, respectively. In instances wherein the received signals are discontinuous, however, the first and second error signals can be calculated based upon powers of the positive offset and negative offset, and independent of the power of the zero offset, of the pilot signal and diversity signal, respectively. Then, after calculating the combined error signal, the sample-selection signal is generated based upon the combined error signal, as shown in block 136. The receiver can therefore be synchronized based upon the sample selection signal.

Therefore, in accordance with embodiments of the present invention, a delay lock loop circuit can be configured to operate in a coherent mode, a transmit diversity mode or a receive diversity mode for a continuous or a discontinuous reference (pilot) signal. The delay lock loop circuit can be alternately operated in an acquisition mode and a tracking mode, irrespective of the amplitude of an input signal applied thereto. The delay lock loop circuit of embodiments of the present invention is therefore configurable in a number of different modes, operable in an amplitude-independent and deterministic manner, irrespective of the signal levels of input signals applied thereto.

According to one aspect of the present invention, all or a portion of the terminal 12 and/or base station 14, including all or a portion of the delay lock loop circuit (e.g., delay lock loop circuit 58, 112, 116 and/or 118), of embodiments of the present invention generally operate under control of, or are otherwise embodied by, one or more computer program products. The computer program product(s) for performing the methods of embodiments of the present invention includes at least one computer-readable storage medium, such as the non-volatile storage medium, and computer-readable program code portions, such as a series of computer instructions, embodied in the computer-readable storage medium.

In this regard, FIGS. 2-8 and 9 are control flow block diagrams and a flowchart of methods, systems and program products according to the invention. It will be understood that each block or step of the control flow block diagram, and combinations of blocks in the control flow block diagram, can be implemented by computer program instructions. These computer program instructions may be loaded onto a computer or other programmable apparatus to produce a machine, such that the instructions which execute on the computer or other programmable apparatus create means for implementing the functions specified in the control flow block diagram block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the control flow block diagram block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the control flow block diagram block(s) or step(s).

Accordingly, blocks or steps of the control flow block diagram support combinations of means for performing the specified functions, combinations of steps for performing the specified functions and program instruction means for performing the specified functions. It will also be understood that each block or step of the control flow block diagram, and combinations of blocks or steps in the control flow block diagram, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A receiver for receiving signals transmitted thereto from a transmitter during operation of a radio communication system, the receiver comprising:

a delay lock loop circuit capable of receiving signals, including a pilot signal and a diversity signal, at least one of transmitted from or received by a plurality of antennas, wherein the delay lock loop circuit is capable of calculating a first error signal based upon the pilot signal and a second error signal based upon the diversity signal, and forming a combined error signal based upon the first and second error signals, and wherein the delay lock loop circuit is capable of synchronizing the receiver with the transmitter based upon the combined error signal.

2. A receiver according to claim 1, wherein the delay lock loop circuit comprises:

a first arrangement capable of calculating the first error signal based upon sampled representations of the pilot signal;

a second arrangement capable of calculating the second error signal based upon sampled representations of the diversity signal; and a summation element capable of forming the combined error signal based upon the first and second error signals.

3. A receiver according to claim 2, wherein the delay lock loop circuit is configured in a transmit diversity mode to receive a pilot signal and a diversity signal from a plurality of transmit antennas through a channel, wherein the first arrangement is capable of mixing sampled representations of the pilot signal with a first cover code, and thereafter calculating the first error signal based upon the mixed signals, and wherein the second arrangement is capable of mixing sampled representations of the diversity signal with a second cover code, and thereafter calculating the second error signal based upon the mixed signals.

4. A receiver according to claim 2, wherein the delay lock loop circuit is configured in a receive diversity mode to receive a pilot signal and a diversity signal from a plurality of receive antennas, a first antenna receiving the pilot signal and a second antenna receiving the diversity signal, wherein the first arrangement is capable of calculating the first error signal based upon sampled representations of the pilot signal received by the first antenna, and wherein the second arrangement is capable of calculating the second error signal based upon sampled representations of the diversity signal received by the second antenna.

5. A receiver according to claim 1, wherein the delay lock loop circuit comprises a selector capable of alternately selecting operation of the delay lock loop circuit in an acquisition mode and a tracking mode.

6. A receiver according to claim 1, wherein the delay lock loop circuit is capable of receiving a discontinuous pilot signal and diversity signal, and wherein the delay lock loop circuit is capable of calculating the first error signal based upon sampled representations of the pilot signal, and calculating the second error signal based upon sampled representations of the diversity signal.

7. A receiver according to claim 6, wherein the sampled representations of each of the pilot signal and diversity signal include a zero offset, a positive offset and a negative offset, wherein the delay lock loop circuit is capable of calculating the first error signal based upon powers of the positive and negative offsets, and independent of a power of the zero offset, of the pilot signal, and wherein the delay lock loop is capable of calculating the second error signal based upon powers of the positive and negative offsets, and independent of a power of the zero offset, of the diversity signal.

8. A receiver, for receiving signals transmitted thereto from a transmitter during operation of a radio communication system, the receiver comprising:

a delay lock loop circuit capable of receiving discontinuous signals, wherein the delay lock loop circuit is capable of forming sampled representations of the received signals, the sampled representations including a zero offset, a positive offset and a negative offset, wherein the delay lock loop is capable of calculating an error signal based upon powers of the positive and negative offsets, and independent of a power of the zero offset, wherein the delay lock loop circuit is capable of synchronizing the receiver with the transmitter based upon the error signal, wherein the signals received by the delay lock loop circuit include a pilot signal and a diversity signal at least one of transmitted from or received by a plurality of antennas, wherein the delay lock loop circuit is capable of forming sampled representations of each of the pilot signal and diversity signal, wherein the delay lock loop circuit is capable of calculating a first error signal based upon sampled representations of the pilot signal and a second error signal based upon sampled representations of the diversity signal, and forming a combined error signal based upon the first and second error signals, and wherein the delay lock loop circuit is capable of synchronizing the receiver with the transmitter based upon the combined error signal.

9. A receiver according to claim 8, wherein the delay lock loop circuit comprises:

a first arrangement capable of calculating the first error signal based upon sampled representations of the pilot signal;

a second arrangement capable of calculating the second error signal based upon sampled representations of the diversity signal; and a summation element capable of forming the combined error signal based upon the first and second error signals.

10. A receiver according to claim 9, wherein the delay lock loop circuit is configured in a transmit diversity mode to receive a pilot signal and a diversity signal from a plurality of transmit antennas through a channel, wherein the first arrangement is capable of mixing sampled representations of the pilot signal with a first cover code, and thereafter calculating the first error signal based upon the mixed signals, and wherein the second arrangement is capable of mixing sampled representations of the diversity signal with a second cover code, and thereafter calculating the second error signal based upon the mixed signals.

11. A receiver according to claim 9, wherein the delay lock loop circuit is configured in a receive diversity mode to receive a pilot signal and a diversity signal from a plurality of receive antennas, a first antenna receiving the pilot signal and a second antenna receiving the diversity signal, wherein the first arrangement is capable of calculating the first error signal based upon sampled representations of the pilot signal received by the first antenna, and wherein the second arrangement is capable of calculating the second error signal based upon sampled representations of the diversity signal received by the second antenna.

12. A receiver according to claim 8, wherein the delay lock loop circuit comprises a selector capable of alternately selecting operation of the delay lock loop circuit in an acquisition mode and a tracking mode.

13. A receiver according to claim 8, wherein the delay lock loop circuit is capable of calculating the first error signal based upon powers of the positive and negative offsets, and independent of a power of the zero offset, of the pilot signal, and wherein the delay lock loop is capable of calculating the second error signal based upon powers of the positive and negative offsets, and independent of a power of the zero offset, of the diversity signal.

14. A method for synchronizing signals at a receiver, the signals transmitted from a transmitter to the receiver during operation of a radio communication system, the method comprising:

receiving a pilot signal and a diversity signal at least one of transmitted from or received by a plurality of antennas;

calculating a first error signal based upon the pilot signal;

calculating a second error signal based upon the diversity signal;

forming a combined error signal based upon the first and second error signals; and synchronizing the receiver with the transmitter based upon the combined error signal.

15. A method according to claim 14, wherein receiving a pilot signal and a diversity signal comprises receiving a pilot signal and a diversity signal from a plurality of transmit antennas through a channel, wherein calculating a first error signal comprises mixing sampled representations of the pilot signal with a first cover code, and thereafter calculating the first error signal based upon the mixed signals, and wherein calculating a second error signal comprises mixing sampled representations of the diversity signal with a second cover code, and thereafter calculating the second error signal based upon the mixed signals.

16. A method according to claim 14, wherein receiving a pilot signal and a diversity signal comprises receiving a pilot signal and a diversity signal from a plurality of receive antennas, a first antenna receiving the pilot signal and a second antenna receiving the diversity signal, wherein calculating a first error signal comprises calculating a first error signal based upon sampled representations of the pilot signal received by the first antenna, and wherein calculating a second error signal comprises calculating a second error signal based upon sampled representations of the diversity signal received by the second antenna.

17. A method according to claim 14, wherein receiving a pilot signal, calculating a first error signal and a second error signal, forming a combined error signal, and synchronizing the receiver occur at a delay lock loop circuit, and wherein the method further comprises:

alternately selecting operation of the delay lock loop circuit in an acquisition mode and a tracking mode.

18. A method according to claim 14, wherein receiving a pilot signal and a diversity signal comprises receiving a discontinuous pilot signal and diversity signal, wherein calculating a first error signal comprises calculating a first error signal based upon sampled representations of the pilot signal, and wherein calculating a second error signal comprises calculating a second error signal based upon sampled representations of the diversity signal.

19. A method according to claim 18, wherein the sampled representations of each of the pilot signal and diversity signal include a zero offset, a positive offset and a negative offset, wherein calculating a first error signal comprises calculating a first error signal based upon powers of the positive and negative offsets, and independent of a power of the zero offset, of the pilot signal, and wherein calculating a second error signal comprises calculating a second error signal based upon powers of the positive and negative offsets, and independent of a power of the zero offset, of the diversity signal.

20. A method for synchronizing signals at a receiver, the signals transmitted from a transmitter to the receiver during operation of a radio communication system, the method comprising:

receiving discontinuous signals and forming sampled representations of the received signals, the sampled representations including a zero offset, a positive offset and a negative offset;

calculating an error signal based upon powers of the positive and negative offsets, and independent of a power of the zero offset; and synchronizing the receiver with the transmitter based upon the error signal, wherein receiving discontinuous signals comprises receiving a pilot signal and a diversity signal at least one of transmitted from or received by a plurality of antennas, wherein calculating an error signal comprises:

calculating a first error signal based upon the pilot signal;

calculating a second error signal based upon the diversity signal; and forming a combined error signal based upon the first and second error signals, and wherein synchronizing the receiver comprises synchronizing the receiver with the transmitter based upon the combined error signal.

21. A method according to claim 20, wherein receiving a pilot signal and a diversity signal comprises receiving a pilot signal and a diversity signal from a plurality of transmit antennas through a channel, wherein calculating a first error signal comprises mixing sampled representations of the pilot signal with a first cover code, and thereafter calculating the first error signal based upon the mixed signals, and wherein calculating a second error signal comprises mixing sampled representations of the diversity signal with a second cover code, and thereafter calculating the second error signal based upon the mixed signals.

22. A method according to claim 20, wherein receiving a pilot signal and a diversity signal comprises receiving a pilot signal and a diversity signal from a plurality of receive antennas, a first antenna receiving the pilot signal and a second antenna receiving the diversity signal, wherein calculating a first error signal comprises calculating a first error signal based upon sampled representations of the pilot signal received by the first antenna, and wherein calculating a second error signal comprises calculating a second error signal based upon sampled representations of the diversity signal received by the second antenna.

23. A method according to claim 20, wherein receiving a pilot signal, calculating a first error signal and a second error signal, forming a combined error signal, and synchronizing the receiver occur at a delay lock loop circuit, and wherein the method further comprises:

alternately selecting operation of the delay lock loop circuit in an acquisition mode and a tracking mode.

24. A method according to claim 20, wherein calculating a first error signal comprises calculating a first error signal based upon powers of the positive and negative offsets, and independent of a power of the zero offset, of the pilot signal, and wherein calculating a second error signal comprises calculating a second error signal based upon powers of the positive and negative offsets, and independent of a power of the zero offset, of the diversity signal.

* * * * *